Patented Oct. 11, 1938

2,132,621

UNITED STATES PATENT OFFICE 2,132,621

SOYA MEAL FOR FEED

Artemy A. Horvath, Newark, Del.

No Drawing. Application November 2, 1937,
Serial No. 172,379

6 Claims. (Cl. 99—9)

This invention pertains to improvements in soya meal for feeding animals.

Soya meal is used extensively as feed for stock, such as cattle, hogs, etc. This meal is a product resulting from removal of oil from the soy bean, so-called. The oil may have been removed by an hydraulic press, or by an expeller, or by extraction with solvents; nevertheless the residual meal has exhibited some undesirable effects when fed to stock. The meal has resulted in gas formation in the intestinal tract, and in faulty digestion and assimilation, and also in excessive hydration or looseness in the intestines of animals.

An object of this invention is to treat comminuted soya in general, and preferably to treat soya meal, so as to avoid flatulence in animals ingesting this feed. A further object is to improve the digestibility of soya meal and the assimilation of food values and generally to improve the utilization of food in the alimentary tract of cattle, hogs and the like. These and other objects will appear from the statement of principles of this invention set forth in the following illustrative description and further defined in the appended claims.

According to this invention important benefits result from incorporating with soya feed for animals certain strains of bacteria. In particular, certain effective strains of bacteria for this purpose are developed by growth during fermentation of soy beans with cereal grains and salt. Such preferred strains are of the following: *B. mesentericus, B. subtilis, and B. vulgatus.*

Illustrative of preferred practice, though this invention may be practiced otherwise, use is made of the residue left from the production of soy sauce, so-called. Soy sauce is manufactured by fermenting a mixture of boiling soy beans, barley or wheat, sodium chloride and water. Such production of soy sauce is known of itself and is described in U. S. Department of Agriculture Bulletin 1152 (1923). The soy sauce fermentation lasts many months, during which are developed specific strains of bacteria useful in the present invention, bacteria of the group: *B. mesentericus, B. subtilis* and *B. vulgatus*. After fermentation the liquid is separated, leaving a semi-solid mass called "moromi". This is a culture of these developed bacterial strains which I have discovered are fit to enhance digestion and break down soya meal to desired food values under conditions prevailing in the intestines of cattle, hogs and the like.

For best effectuating the purposes of this invention, this soy sauce residue is dried at low temperature, up to about 40° C., preferably under vacuum, is finely ground, and is mixed dry with dry soya oil meal. Under these conditions the specific bacteria maintain their potential digestive power, but are compatible with the soya meal under atmospheric or storage conditions. The proportion of moromi added to soya meal need not be large, about one tenth of one percent, though greater amounts to several percent may be used.

When this complex composition is fed to cattle, hogs and the like, it encounters in the intestinal tract of the animals a condition of hydrogen ion concentration of about pH 7.4. Under such hydrogen ion concentration and at animal temperatures, this composition gradually is converted into proteoses, peptones and aminoacids. Further, absorption is facilitated of peptides and aminoacids from the intestines, which is to say that digestive efficiency or utilization of food values is considerably enhanced.

While the benefits of this invention are not limited by theoretical explanation, it appears that heretofore, when soya meal has been ingested by animals without the benefit of bacteria here set forth, the soya meal has decomposed into putrefactive products rather than into beneficial food. For example, protein decomposition has developed in the animal intestines indole, skatole, paracresol, phenol, paraoxyphenylpropionic acid, paraoxyphenylacetic acid, volatile fatty acids, hydrogen sulfide, methane, methyl mercaptan, etc.

While this invention has been described by illustration of preferred examples in accordance with the patent statutes it will now be apparent to those skilled in this art that the principles of this invention may be embodied in other forms than those specifically set forth, within the scope of the appended claims.

What is claimed is:

1. An improved feed composition for animals, comprising soya meal containing at least one of the bacterial strains from the group consisting of *B. mesentericus, B. subtilis* and *B. vulgatus*.

2. An improved feed composition for animals, comprising soya meal and moromi.

3. A process of preparing animal feed comprising, fermenting soy beans and cereal grain and admixing residual solids with soya meal.

4. A process of preparing animal feed comprising, fermenting soy beans and cereal grain, drying residual solids at temperatures up to about 40° C., and mixing this dry residue with soya meal.

5. A process of preparing animal feed comprising, developing at least one of the group consisting of *B. mesentericus, B. subtilis,* and *B. vulgatus* by growth in the presence of soy beans, and then innoculating soya meal therewith.

6. A process of preparing animal feed comprising, developing *B. mesentericus, B. subtilis* and *B. vulgatus* by growth in the presence of soy beans, cereal grain and salt and then treating soya meal therewith in liquid of hydrogen ion concentration of about pH 7.4.

ARTEMY A. HORVATH.